United States Patent Office.

ALFRED PARAF, OF NEW YORK, N. Y., ASSIGNOR TO EDWARD SABINE RENWICK, TRUSTEE, OF SAME PLACE.

Letters Patent No. 110,994, dated January 17, 1871.

IMPROVEMENT IN MATERIAL CALLED "OLE-IZERINE," FOR DYEING AND PRINTING.

The Schedule referred to in these Letters Patent and making part of the same.

*To all whom it may concern:*

Be it known that I, ALFRED PARAF, of France, now residing in the city, county, and State of New York, have made an invention or discovery of a new and useful article of manufacture or composition of matter, which I denominate "Ole-izerine;" and that the following is a full, clear, and exact description and specification of the same.

My invention consists of a new compound of the coloring-matter of madder with oily matter, its distinctive characteristic being that the oily matter is so combined with the coloring-matter that the addition of oil to the color prepared for printing fabrics is not required, and that the red color printed by means of it has the characteristics of the Turkey red produced by dyeing cloth with a compound of madder and oil.

Ole-izerine may be prepared in the following manner:

Dissolve one part, by weight, of paraffine in two parts, by weight, of refined petroleum, or the same quantity of kerosene.

Boil one part, by weight, of dry garancine with three parts, by weight, of the above mixture for half an hour, continually stirring the mixture.

Separate the solution by straining the product by means of a cloth.

Boil the partially-exhausted garancine with three additional parts of the above mixture, in the same manner as before, and separate the solution by straining the product by means of a cloth, using pressure to separate the last portions of the liquid.

Permit the solution, as it is strained, to run into water, the quantity of water which may be used with advantage for this purpose being about eight times the weight of the garancine employed.

The solution rises to the surface and floats upon the water.

Stir into the mass a saturated solution of caustic soda, in water, in sufficient quantity to cause the coloring-matter to separate from the hydrocarbon solvent, and to dissolve in the water.

The soda solution is added, drop by drop, until the effect is produced, a slight excess being not injurious.

If a sufficient quantity of the soda solution has not been added, the hydrocarbon which floats on the top of the water will remain colored, in which case an additional quantity of the soda solution should be applied.

If the required quantity of soda solution has been employed, the hydrocarbon is left practically colorless, floating on the surface of the aqueous solution of the coloring-matter.

The liquid is allowed to settle after the addition of the soda solution, and the aqueous solution is separated from the hydrocarbon by drawing off the former or by decanting the latter. The hydrocarbon may then be used again for treating a new quantity of garancine.

The aqueous solution is treated with an acid that will combine with the soda and cause the precipitation of the coloring-matter. The acid preferred for this purpose is muriatic acid, which is stirred into the aqueous solution, drop by drop, until no further precipitation ensues. The precipitate is then separated from the liquid by means of a cloth filter, and is thoroughly washed with water on the filter.

The precipitate thus obtained is ole-izerine in a moist state. It may be used in that condition, or may be previously dried by exposure to air, with or without the aid of heat.

Instead of treating the garancine with petroleum in which paraffine has been dissolved, it may be treated with a petroleum-oil, such as kerosene, without paraffine. Kerosene boiling at a temperature of from 300° to 340° Fahrenheit is well adapted to this purpose.

The operation may be conducted in the manner above described, and the ole-izerine may be obtained from the fluid extract, as above described. Or, instead of permitting the kerosene solution to run from the filters into water, it may be collected in bulk, and mixed in a vat with an equal quantity of boiling water. An aqueous solution of caustic soda at 6° Baumé, in the proportion of one-quarter of one per cent. of the mixture, is added to it, and the whole is thoroughly mixed by stirring it. The mixture is then permitted to settle, the aqueous solution is separated from the kerosene, and is treated with an acid, and filtered, as above described, to obtain the ole-izerine.

The article or composition of matter denominated ole-izerine is not restricted by the process or by the means employed in producing it, as these may be varied. Moreover, the material may be adulterated, by incorporating other articles with it, without materially changing its constitution and properties. It is particularly valuable for the purpose of manufacturing madder colors for printing fabrics, and for this purpose it may be manufactured into rubidide.

I claim as the invention to be secured by Letters Patent—

The new article of manufacture denominated ole-izerine, and hereinbefore described.

In testimony whereof I have hereto set my hand this 13th day of September, A. D. 1869.

ALFRED PARAF.

Witnesses:
 E. S. RENWICK,
 W. L. BENNEM.